United States Patent [19]

Goodlaxson

[11] 4,026,323
[45] May 31, 1977

[54] FAUCET COUPLER ASSEMBLY

[75] Inventor: John D. Goodlaxson, Colfax, Iowa

[73] Assignee: The Maytag Company, Newton, Iowa

[22] Filed: Feb. 23, 1976

[21] Appl. No.: 660,322

[52] U.S. Cl. ............................... 137/562; 137/583
[51] Int. Cl.² .......................................... B05B 1/22
[58] Field of Search ............... 137/562, 583; 285/8, 285/DIG. 25

[56] References Cited

UNITED STATES PATENTS

| 3,593,743 | 7/1971 | Guth | 137/583 X |
| 3,630,227 | 12/1971 | Race | 137/583 |
| 3,635,243 | 1/1972 | Brezosky | 137/562 X |

Primary Examiner—William R. Cline
Attorney, Agent, or Firm—Richard L. Ward

[57] ABSTRACT

A coupler assembly for a portable washing machine which includes a mechanism associated with an operating lever and a pressure relief means to provide automatic sequential depressurization and then decoupling of the assembly from the faucet when the operating lever is moved in an axial direction.

14 Claims, 9 Drawing Figures

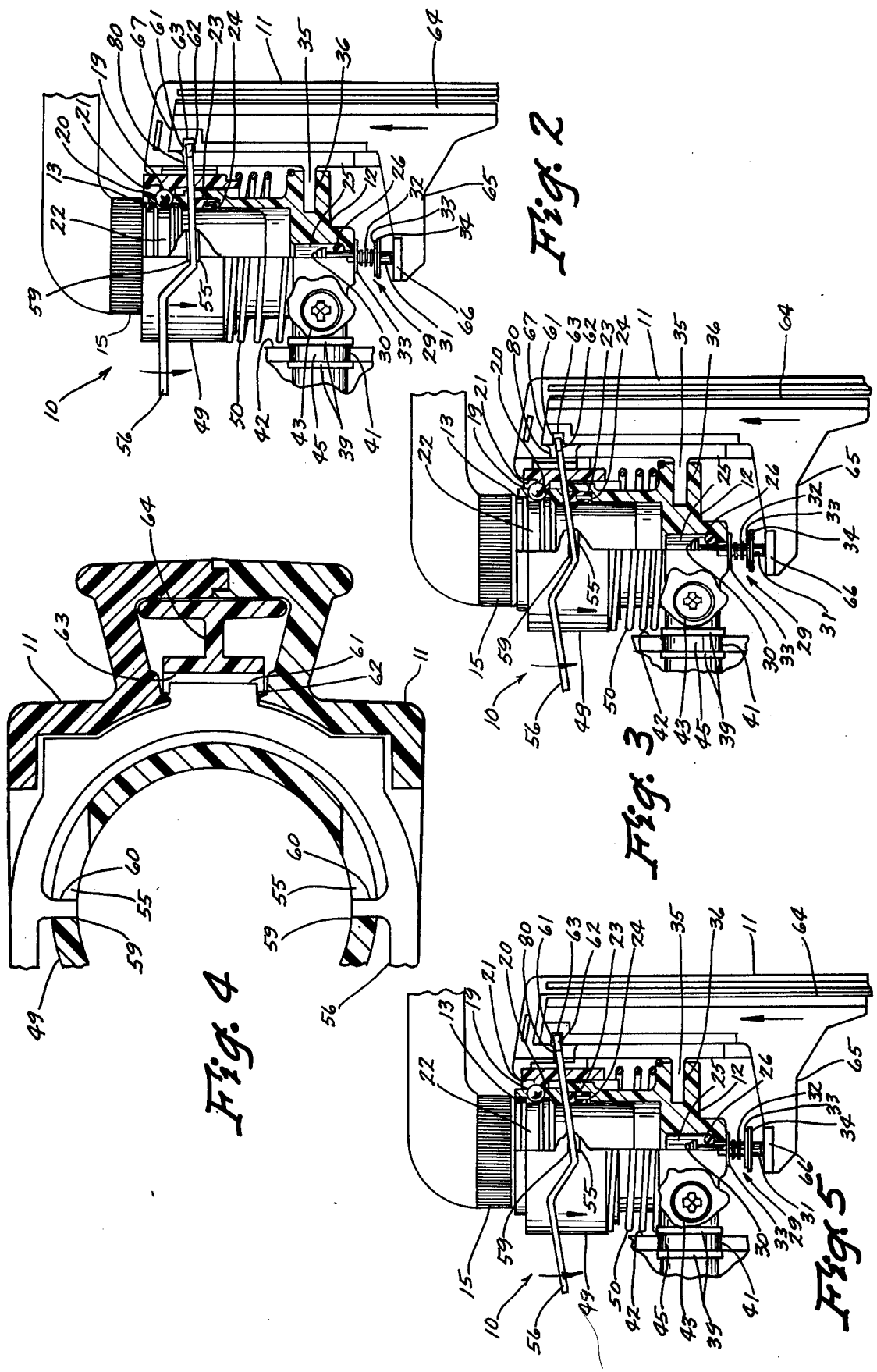

FAUCET COUPLER ASSEMBLY

BACKGROUND OF THE INVENTION

1. Field of the Invention

This invention relates generally to fluid handling devices and more particularly to an improved device for sequentially depressurizing and decoupling a pressurized coupler from a faucet.

2. Description of the Prior Art

Prior coupler art shows a continuing search for methods of depressurizing a coupler while also decoupling the assembly from a faucet. U.S. Pat. No. 3,124,157 for example shows a coupler having an actuator mounted at right angles to the coupler body. Moving the actuator first depressurizes the coupler and then further movement decouples the unit from the faucet by expanding a spring retainer. U.S. Pat. No. 3,190,311 also discloses a mechanism mounted at right angles to the coupler body. Initial movement of the mechanism depressurizes the coupler and further movement releases a spring biased pivoted latch to release the assembly from a faucet. In U.S. Pat. No. 3,444,890 a rotary valve having a single opening is movable for registering the valve opening with an opening associated with a washing machine or an opening associated with an aerator which discharges into the sink. Pressure is relieved by lapping the valve hole over the two openings. Coupling and decoupling of the assembly is also accomplished by the rotary valve. Also, in U.S. Pat. No. 3,593,743 a mechanism is provided for relieving pressure by pressing the decoupling lever which pivots a relief valve through mechanical linkage. This method according to the patent provides a simultaneous depressurizing-decoupling action. There nevertheless remains a need for a coupler assembly having an axially movable retaining ring which will assure, in one simple axial movement, a sequential depressurizing and then decoupling of the coupler.

SUMMARY OF THE INVENTION

It is therefore an object of this invention to provide an improved coupler assembly for a washing machine.

It is a further object of this invention to provide a coupler having an automatic pressure release means.

It is a still further object of this invention to provide a coupler release mechanism to assure sequential depressurizing and decoupling of the coupler assembly.

The instant invention achieves these objects in a coupler assembly having a release mechanism operatively connected to a pressure release means wherein initial movement of the release mechanism releases the pressure in the coupler and further movement releases the coupler assembly from the faucet.

Operation of the device and further objects and advantages thereof will become evident as the description proceeds and from an examination of the accompanying three sheets of drawings.

BRIEF DESCRIPTION OF THE DRAWINGS

The drawings illustrate preferred embodiments of the invention with similar numerals referring to similar parts throughout the several views, wherein:

FIG. 2 is a fragmentary view showing the operating lever partially advanced;

FIG. 3 is a view similar to FIG. 2 with the lever fully advanced;

FIG. 4 is a view taken along lines 4—4 of FIG. 1 and shown in an enlarged scale;

FIG. 5 is a view similar to FIG. 3 showing an alternate embodiment of the instant invention;

DESCRIPTION OF A PREFERRED EMBODIMENT

Figure 1:
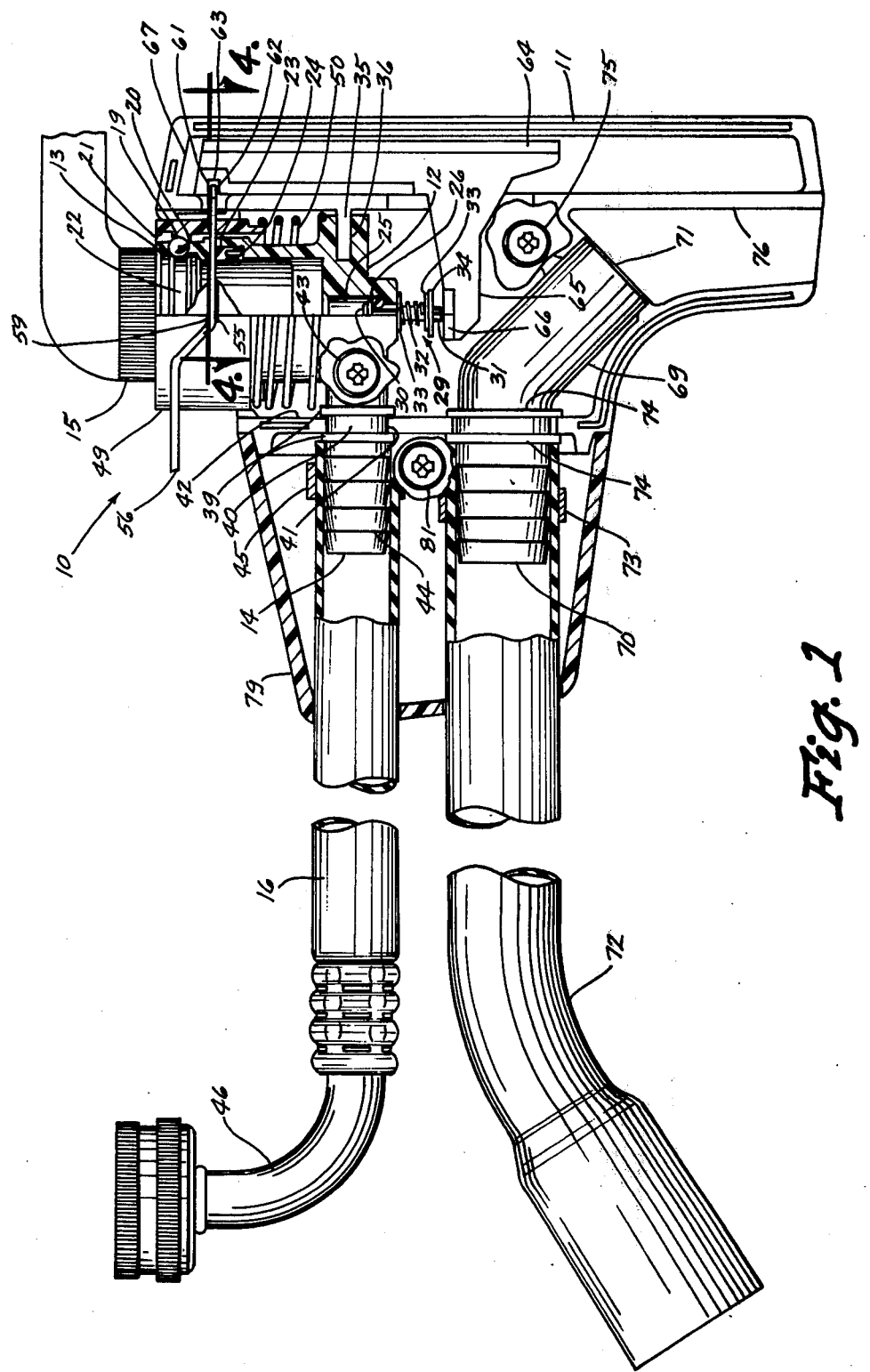
FIG. 1 is a view of a coupler assembly for a portable washer wherein the coupler assembly is partially broken away and sectioned and incorporates the instant invention.

Referring to FIG. 1 there is shown a coupler assembly 10 coupled to a faucet 15. A housing 11 having, in this embodiment, a plurality of communicating compartments or cavities contains and supports the various coupler components which will be described further herein.

As shown in FIG. 1 the coupler assembly 10 includes a coupler body 12 contained and supported within the housing 11. The coupler body 12 is molded of a thermoplastic material and is generally in the configuration of a right angled elbow. The body 12 has an inlet end 13 for coupling with a standard faucet 15 as shown in FIG. 1 and an outlet end 14 for receiving a rubber inlet hose 16 which conducts liquid to a washing machine (not shown).

The inlet end 13 also has a plurality of pockets 20 for receiving a plurality of locking balls 19. A first portion of each of the locking balls 19 is disposed between an inner diameter 21 of a retaining ring 49 and the inlet end 13 of the coupler body 12. A second portion extends through the pocket 20 in the coupler body 12 to engage an annular groove 22 on the faucet 15 for locking the coupler assembly 10 to the faucet 15. These pockets 20 are sized so that the second inner portion of each of the locking balls 19 will extend far enough through the coupler body 12 to engage with the annular groove 22 on the faucet 15 but the ball 19 will not pass completely through the pocket 20.

As further shown in FIG. 1, the inlet end 13 of the coupler body 12 also has an inner annular groove 23 located axially inward from the locking balls 19 for receiving a circular rubber seal 24 to prevent fluid from escaping at the faucet 15.

Coaxial with the inlet end 13 of the coupler body 12 and intermediate the inlet and outlet is a pressure relief passageway 25 as shown in FIGS. 1, 2, 3 and 5. Mounted in this passageway 25 is an "O-ring" seal 26 and a pressure relief valve 29. The head portion 30 of the pressure relief valve 29 is biased toward the "O-ring" seal 26 by a valve spring 32 which surrounds the shaft 31 of the valve 29 and which is retained on the valve shaft 31 by two washers 33 and a locking ring 34.

The coupler body 12 is retained in the housing cavity by a projecting wall 35 in each half of the housing 11 which cooperates with a slot 36 in the coupler body 12 to prevent movement of the coupler body 12 in the housing 11. At the outlet end 14 of the coupler body 12 two spaced apart collars 39 are molded around the conduit. The smaller diameter 40 between these two collars 39 is captured by a matching arcuate cutout 41 in the adjacent wall 42 of each of the halves of the housing 11. The coupler body 12 is finally secured by two screws 43 which join the two halves of the housing 11 to the coupler body 12. Thus the combination of the screws 43, projecting wall 35 and slot 36 and the collars 39 serve to contain the coupler body 12 securely within the housing 11 in all directions.

The outlet end 14 of the coupler body 12 has a plurality of annular serrations 44 molded onto its outer surface for gripping the inner diameter of the inlet hose 16 which is secured to the body 12 with a hose clamp 45. The inlet hose 16 extends from the coupler body 12 to the washing machine where a hose fitting 46 is connected to a water valve (not shown) for regulating water flow to the machine.

Figure 6:
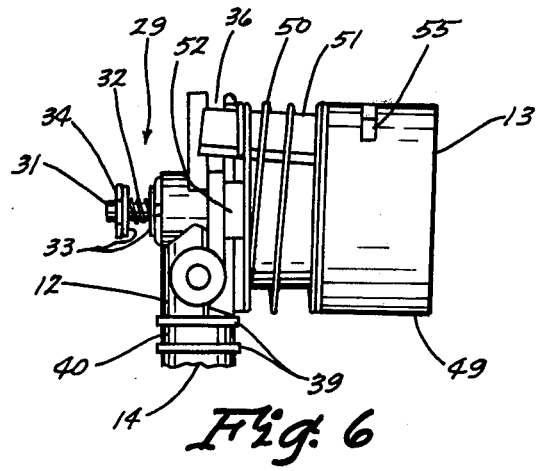
FIG. 6 is a fragmentary side view showing the process of assembly or disassembly of the coupler body and retaining ring.
Figure 7:
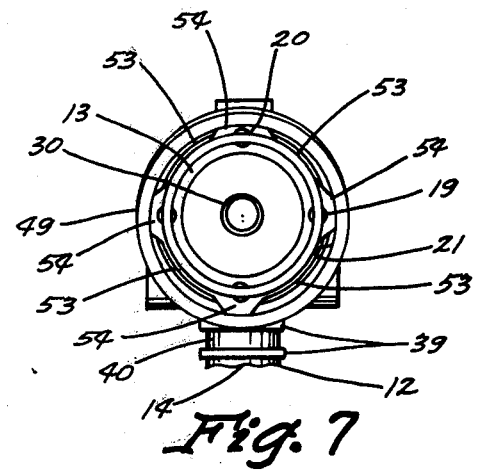
FIG. 7 is a fragmentary end view showing the process of assembly or disassembly of the coupler body and retaining ring.
Figure 8:
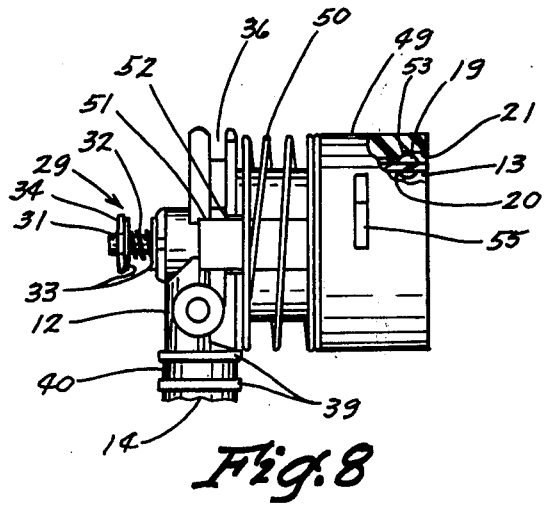
FIG. 8 is a view similar to FIG. 6 showing the coupler body and retaining ring assembled.
Figure 9:
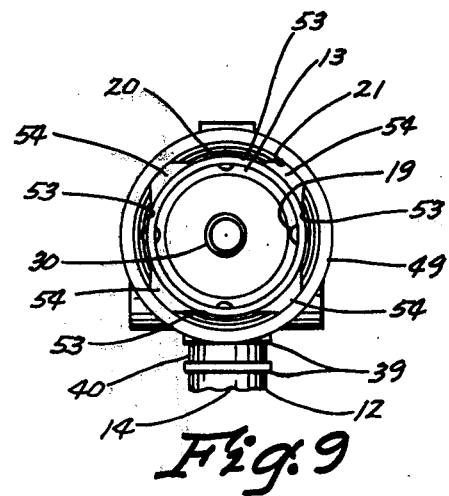
FIG. 9 is a view similar to FIG. 7 showing the coupler body and retaining ring assembled.

As best shown in FIGS. 6 through 9 a retaining ring 49 and a retaining spring 50 are assembled onto the coupler body 12 for cooperating with the locking balls 19 to retain the balls 19 between the body 12 and the ring 49. The retaining ring 49 has a plurality of angularly spaced radially inwardly extending segmental shoulders 53 around its inner periphery 21 which define a plurality of recesses 54, as shown in FIGS. 7 and 9, with one shoulder 53 and one recess 54 for each of the plurality of locking balls 19. As also shown in FIGS. 7 and 9, the inwardly extending shoulders 53 are equally spaced around the inner periphery 21 of the retaining ring 49 with the recesses 54 equally disposed between the shoulders 53. The inner diameter 21 of the retaining ring 49 cooperates with the coupler body 12 to allow the locking balls 19 to move radially outward in the faucet receiving-releasing position and to prevent the locking balls 19 from completely moving out of their pockets 20.

As shown in FIGS. 6 and 7, the retaining ring 49 is assembled onto the coupler body 12 in a first angular posture by aligning the recesses 54 with the locking balls 19 and axially moving the retaining ring 49 rearward onto the coupler body 12 with an axially extending leg portion 51 in a position as shown in FIG. 6. The retaining ring 49 is next rotated approximately 45° counterclockwise to a second angular position as in FIG. 8 where the leg portion 51 snaps into the detent slot 52 in the coupler body 12. In this orientation, the retaining ring 49 is biased toward the locking balls 19 by the retaining spring 50 so that the shoulders 53 contact the locking balls 19 to prevent further axial movement of the retaining ring 49 toward the faucet 15.

To disassemble the retaining ring 49 from the coupler body 12, the leg portion 51 is lifted clear of the detent slot 52 and rotated clockwise approximately 45° as shown in FIG. 6 to align the recesses 54 with the locking balls 19 as in FIG. 7. The retaining ring 49 is now free to slide axially off the coupler body 12. The assembly feature is also disclosed and is claimed in a copending application entitled "Retaining Ring Assembly for Faucet Coupler" filed on an even date with this application by John D. Goodlaxson and assigned to the assignee of the instant invention.

Mounted on the retaining ring 49 in two support slots 55, as best shown in FIG. 4, is an operating lever or first operating means 56. This lever 56 pivots at two points. The first pivot 59 is where two lugs 60 contact the support slots 55 in the retaining ring 49. The second pivot 61 is where an end portion of the lever 62 engages a recess 63 in a slider or second operating means 64 as shown in FIGS. 1 and 4.

The slider 64 is slideably supported by the housing 11 as shown in FIGS. 1 and 4 and is movable from a first position as in FIG. 1 to a second position as in FIG. 2 for engagement with and actuation of the pressure relief valve 29. The slider 64 has a generally I-cross-section as shown in FIG. 4 and has a recess 63 at one end juxtaposed the end portion 62 of the lever 56 for receiving the end portion 62. The opposite end of the slider 64 has a laterally extending arm 65 with an enlarged pad 66 for engaging the shaft 31 of the relief valve 29.

The retaining spring 50 and the valve spring 32 cooperate with the slider 64 and the operating lever 56 during downward axial movement of the operating lever 56 to define alternating fixed and moving pivots at the first pivot 59 at the retaining ring 49 and the second pivot 61 at the slider 64 at different stages of movement. In a preferred embodiment of this invention the retaining spring 50 is approximately five times stronger than the valve spring 32. Because of this difference in strength, when the operating lever 56 is initially moved, the first pivot 59 at the retaining ring 49 is a fixed pivot and the second pivot 61 at the slider 64 is a moving pivot. The slider 64 is free to move in the housing 11 and the pad 66 engages the shaft 31 of the relief valve 29 and opens the valve 29 against the weak bias of the valve spring 32. During this slider 64 movement, the retaining ring 49 is held stationary by the strong bias of the retaining spring 50. When the operating lever 56 has been advanced so that the slider engages a stop 67, the second pivot point 61 at the slider 64 becomes a fixed pivot and the first pivot 59 at the retaining ring 49 becomes a moving pivot. Continued advancement of the operating lever 56 moves the retaining ring 49 axially against the bias of the retaining spring 50.

Also retained within the cavity of the housing 11 is a discharge conduit 69 having an inlet end 70 connected to the drain hose 72 of the washing machine and an outlet end 71 for discharging liquid into a sink. As shown in FIG. 1 the drain hose 72 is connected to a serrated portion of the conduit by a hose clamp 73. As in the coupler body 12, the discharge conduit 69 has two spaced apart collars 74 molded around its serrated end and is captured in a like manner by the adjacent wall 42 of the housing 11. The discharge conduit 69 is also fastened to the housing 11 by screws 75 in a manner similar to that of the coupler body 12. The discharge conduit 69 is positioned in the housing 11 so that the fluid discharge will impinge on a housing wall 76, as in FIG. 1, to fan out the discharge thus reducing splashing in the sink.

When the coupler body 12 and the discharge conduit 69 have been secured in the housing 11 by driving the screws 43 and 75, the coupler assembly 10 is completed by sliding the pistol grip portion 79 of the assembly 10 into place and driving the additional screws 81 to keep this grip portion 79 in place.

Operation of the invention is shown in FIGS. 1, 2 and 3. FIG. 1 shows the coupler assembly 10 attached to a faucet 15 with the operating lever 56 and slider 64 in a neutral nonactuated position. Also in FIG. 1 the valve spring 32 is shown biasing the relief valve 29 to a closed or sealing position and the retaining spring 50 is biasing the retaining ring 49 to a faucet locking position. In FIG. 2, as downward axial pressure is placed on the operating lever 56, the lever 56 pivots simultaneously at the two pivot points 59 and 61. At this time, the first pivot point 59 at the retaining ring 49 is a fixed pivot while the second pivot 61 at the slider 64 is a moving pivot. This action moves the slider 64 toward an interior wall or stop 67 in the housing 11 and moves the arm portion 65 of the slider 64 and its associated enlarged pad 66 toward the relief valve 29. This movement overcomes the low biasing force of the valve spring 32, opens the valve 29 and depressurizes the coupler body 12 while the retaining ring 49 remains stationary.

In FIG. 3, the slider 64 is shown against the stop 67 in the housing 11 and the operating lever 56 is being moved further in a generally axial direction. When te slider 64 contacts the stop 67, the second pivot 61 at the slider 64 becomes a fixed pivot and the first pivot 59 at the ring 49 becomes a moving pivot. Additional movement of the operating lever 56 moves the retaining ring 49 axially against the bias of the retaining spring 50 to a faucet receiving-releasing position as shown in FIG. 3. In the faucet receiving-releasing position the locking balls 19 are free to move radially toward or away from the annular groove 22 in the faucet 15. Therefore it can be seen that this mechanism provides a sequential depressurization and then decoupling action for a coupler assembly 10 through a simple generally axial movement of the operating lever 56.

The operating lever or first operating means 56 and slider or second operating means 64 may be considered as comprising connecting means between the retaining ring 49 and valve 29. This connecting means is thus movable from a first neutral posture as in FIG. 1 to a second posture as in FIG. 2 for actuating the pressure relief valve 29 while the retaining ring 49 remains in the faucet locking position. The connecting means is further movable to a third posture as in FIG. 3 for overcoming the bias of the retaining spring 50 to axially move the retaining ring 49 to the faucet receiving-releasing position.

An additional embodiment is shown in FIG. 5. In this embodiment, the operation is the same as in FIGS. 2 and 3 except that the slider 64 does not travel to the stop 67. Instead the operating lever 56 pivots fixedly at the first pivot point 59 at the ring 49 and the second pivot 61 at the slider 64 moves until the operating lever 56 contacts a shoulder portion 80 of the housing 11. At this time the first pivot point 59 at the ring 49 becomes the moving pivot and decoupling takes place as before.

It is therefore seen that the instant invention provides clear and distinct advantages over faucet coupler assemblies shown in the prior art. With one simple continuous axial movement the operator can sequentially automatically depressurize and decouple the assembly from the faucet.

In the drawings and specifications there has been set forth a preferred embodiment of the invention and although specific terms are employed these are used in a generic and descriptive sense only and not for purposes of limitation. Changes in form and proportion of parts, as well as the substitution of equivalents, are contemplated, as circumstances may suggest or render expedient, without departing from the spirit or scope of this invention as defined in the following claims.

I claim:

1. A coupler assembly for connecting a portable washing machine to a faucet disposed generally above a sink, the combination comprising: a coupler body defining a conduit having an inlet end connectable to said faucet and an outlet end connectable to said machine, said body further including a pressure release opening intermediate said inlet and outlet ends; valve means biased to a closed position for sealing said pressure release opening against leakage of liquid; means for connecting said inlet end to said faucet including a retaining ring at said inlet end axially movable from a faucet locking position to a faucet receiving-releasing position; spring means for biasing said retaining ring to said faucet locking position; and a coupler release mechanism associated with said coupler body for sequentially depressurizing and decoupling said coupler assembly from said faucet including connecting means operatively connecting said retaining ring and said valve means and movable from a first posture to a second posture for actuating said valve means to relieve the pressure in said conduit while said spring means maintains said retaining ring substantially unmoved from said faucet locking position and then subsequently movable from said second posture to a third posture for overcoming said spring means to axially move said retaining ring to said faucet receiving-releasing position whereby initial movement of said connecting means releases the pressure in said conduit and further movement of said connecting means releases the coupler assembly from said faucet.

2. A coupler assembly as defined in claim 1 wherein said connecting means includes a movable lever pivotally supported on said retaining ring for moving said retaining ring to said faucet receiving-releasing position.

3. A coupler assembly as defined in claim 2 wherein said connecting means further includes a slider for operatively joining said valve means and said movable lever to provide for said sequential depressurizing and decoupling of said coupler assembly.

4. A coupler assembly for connecting a portable washing machine to a faucet disposed generally above a sink, the combination comprising: a coupler body defining a conduit having an inlet end connectable to said faucet and an outlet end connectable to said machine, said body further including a pressure release opening; valve means biased to a closed position for sealing said pressure release opening against leakage of liquid; first spring means for biasing said valve member to said closed position; means for connecting said inlet end to said faucet including a retaining ring at said inlet end axially movable from a faucet locking position to a faucet receiving-releasing position; second spring means for biasing said retaining ring to said faucet locking position; and a coupler release mechanism associated with said coupler body for sequentially depressurizing and decoupling said coupler assembly from said faucet including first operating means pivotally supported on said retaining ring and further including second operating means cooperating with said first operating means and said valve means, said second operating means having means for receiving an end portion of said first operating means, said second operating means being movable from a first position to a second position for engagement with and actuation of said valve means to relieve the pressure in said conduit, said first operating means being manually pivotable relative to said retaining ring while said second spring means maintains said retaining ring substantially unmoved for activating said second operating means from said first position to said second position to overcome said first spring means and effect said depressurizing of said coupler body, said first operating means being subsequently pivotable relative to a point juxtaposed said end portion of said first operating means for overcoming said second spring means to move said retaining ring to said faucet receiving-releasing position whereby initial movement of said first operating means releases the pressure in said conduit and further movement releases the coupler assembly from said faucet.

5. A coupler assembly as defined in claim 4 wherein said assembly further includes means for conducting fluid from said machine including a conduit supported at least partially in said housing and having an inlet portion connected to said machine and an outlet portion open to the atmosphere.

6. A coupler assembly as defined in claim 4 wherein said second operating means provides a connecting link between said first operating means and said valve means for automatically releasing fluid pressure prior to decoupling said coupler assembly from said faucet.

7. A coupler assembly for connecting a portable washing machine to a faucet disposed generally above a sink, the combination comprising: a housing defining at least one cavity therewithin; a coupler body supported at least partially within said cavity and defining a conduit having an inlet end connectable to said faucet and an outlet end connectable to said machine, said body further including a pressure release opening intermediate said inlet and outlet ends; valve means biased to a closed position for sealing said pressure release opening against leakage of liquid; first spring means for biasing said valve member to said closed position; means for connecting said inlet end to said faucet including a retaining ring at said inlet end axially movable from a faucet locking position to a faucet receiving-releasing position; second spring means for biasing said retaining ring to said faucet locking position; and a coupler release mechanism for sequentially depressurizing and decoupling said coupler assembly from said faucet including a lever pivotally supported on said retaining ring and further including a slider having means for receiving an end portion of said lever and further having a portion engageable with said valve means, said slider being movable from a first position to a second position for engagement with and actuation of said valve means to relieve the pressure in said conduit, said lever being manually pivotable relative to said retaining ring while said second spring means maintains said retaining ring substantially unmoved for activating said slider from said first position to said second position to overcome said first spring means and effect said depressurizing of said coupler body, said lever being subsequently pivotable relative to a point juxtaposed said lever end portion for overcoming said second spring means to axially move said retaining ring to said faucet receiving-releasing position whereby initial movement of said lever releases the pressure in said conduit and further movement releases the coupler assembly from said faucet.

8. A coupler assembly as defined in claim 7 wherein said lever is pivotable relative to said retaining ring for moving said slider to said second position and said lever is further pivotable relative to said slider while said slider remains substantially unmoved to axially move said retaining ring to said faucet receiving-releasing position.

9. A coupler assembly as defined in claim 7 wherein said lever is first pivotable relative to said retaining ring for moving said slider to said second position and said lever is further pivotable relative to a stationary member associated with said housing, when said slider has traveled a predetermined distance, to axially move said retaining ring to said faucet receiving-releasing position.

10. A coupler assembly as defined in claim 7 wherein said assembly further includes a discharge conduit supported at least partially within said cavity and having an inlet end connectable to said machine and an outlet end for discharging fluid into said sink.

11. A coupler assembly for connecting a portable washing machine to a faucet disposed generally above a sink, the combination comprising: a housing defining at least one cavity therewithin; a coupler body supported at least partially within said cavity and defining a conduit having an inlet end connectable to said faucet and an outlet end connectable to said machine, said body further including a pressure release opening intermediate said inlet and outlet ends for conducting liquid from said body; valve means including a member movable to a closed position for sealing said pressure release opening against leakage of said liquid; first spring means for biasing said valve member to said closed position; means for connecting said inlet end to said faucet including a retaining ring manually movable axially from a faucet locking position to a faucet receiving-releasing position; second spring means for biasing said retaining ring to said faucet locking position with a biasing force substantially exceeding the biasing force of said first spring means; and a coupler release mechanism for sequentially depressurizing and decoupling said coupler assembly including a lever supported on and having a first pivot on said retaining ring and further including a slider disposed within said cavity and having a recess defining a second pivot for an end portion of said lever, said slider being movable from a first position to a second position and having an arm portion operable in said second position for engagement with and actuation of said valve means to an open position for relieving said pressure in said conduit, said lever being manually pivotable relative to said first pivot for activating said slider from said first position to said second position to overcome said first spring means and effect said depressurizing of said coupler body, said lever being further pivotable relative to said second pivot for overcoming said second spring means to axially move said retaining ring to said faucet receiving-releasing position whereby initial movement of said lever releases the pressure in said conduit and further movement releases the coupler assembly from said faucet.

12. A coupler assembly as defined in claim 11 wherein said pressure release opening is generally coaxial with said inlet of said coupler body.

13. A coupler assembly as defined in claim 11 wherein said movement of said retaining ring and said valve member are generally coaxial.

14. A coupler assembly as defined in claim 11 wherein said assembly further includes a discharge conduit supported at least partially within said cavity and having an inlet end connectable to said machine and an outlet end for discharging fluid into said sink.

* * * * *